(12) United States Patent
Yoshinaga

(10) Patent No.: US 12,495,761 B2
(45) Date of Patent: Dec. 16, 2025

(54) ANIMAL TOILET

(71) Applicant: DAIKI CO., LTD., Tokyo (JP)

(72) Inventor: Junji Yoshinaga, Tokyo (JP)

(73) Assignee: DAIKI CO., LTD., Tokyo (JP)

( * ) Notice: Subject to any disclaimer, the term of this patent is extended or adjusted under 35 U.S.C. 154(b) by 29 days.

(21) Appl. No.: 18/581,690

(22) Filed: Feb. 20, 2024

(65) Prior Publication Data

US 2024/0188530 A1   Jun. 13, 2024

Related U.S. Application Data

(63) Continuation of application No. PCT/JP2022/029495, filed on Aug. 1, 2022.

(30) Foreign Application Priority Data

Sep. 22, 2021  (JP) ................................. 2021-153700

(51) Int. Cl.
  *A01K 1/00*  (2006.01)
  *A01K 1/01*  (2006.01)
(52) U.S. Cl.
  CPC .......... *A01K 1/0052* (2013.01); *A01K 1/0107* (2013.01)
(58) Field of Classification Search
  CPC ... A01K 1/0107; A01K 1/0114; A01K 1/0052
  See application file for complete search history.

(56) References Cited

U.S. PATENT DOCUMENTS

| 5,564,364 | A | * | 10/1996 | Kovacs | A01K 1/0107 119/165 |
| 5,988,108 | A | * | 11/1999 | Silver | A01K 1/0052 119/166 |
| 5,996,533 | A | * | 12/1999 | Gordon | A01K 1/011 119/166 |
| 6,341,579 | B1 | * | 1/2002 | Alkire | A01K 1/0107 119/493 |
| 8,181,604 | B1 | * | 5/2012 | Avila | A01K 1/0052 119/448 |
| 9,504,228 | B1 | * | 11/2016 | Ciotic | A01K 1/0052 |
| 9,565,830 | B1 | * | 2/2017 | Caico | A01K 1/0107 |
| 2017/0347618 | A1 | * | 12/2017 | Spadola | A01K 1/0052 |
| 2020/0196563 | A1 | * | 6/2020 | Yoshinaga | B65D 33/00 |
| 2022/0323629 | A1 | * | 10/2022 | Fridman | A01K 1/0047 |

(Continued)

FOREIGN PATENT DOCUMENTS

| JP | 2019-103456 A | 6/2019 |
| JP | 2020-191803 A | 12/2020 |
| JP | 2021-114913 A | 8/2021 |

(Continued)

OTHER PUBLICATIONS

Translation of KR20180100034 (Year: 2018).*

(Continued)

*Primary Examiner* — William L Gmoser
(74) *Attorney, Agent, or Firm* — Oliff PLC

(57) ABSTRACT

An animal toilet includes a body portion, a hood, and a blower. The body portion has a bottom face part and a side face part, and is in a box shape. The hood is provided so as to cover the body portion from above. The hood has an entrance for an animal. The blower is provided in an internal space of the hood.

16 Claims, 16 Drawing Sheets

(56) References Cited

U.S. PATENT DOCUMENTS

2023/0051699 A1* 2/2023 Okawa ................. A01K 1/0052

FOREIGN PATENT DOCUMENTS

| JP | 2021-129537 A | | 9/2021 | |
|---|---|---|---|---|
| KR | 20180100034 A | * | 9/2018 | ........... A01K 1/0107 |
| WO | 2021/119568 A1 | | 6/2021 | |

OTHER PUBLICATIONS

Sep. 6, 2022 International Search Report issued in International Patent Application No. PCT/JP2022/029495.
Sep. 6, 2022 Written Opinion issued in International Patent Application No. PCT/JP2022/029495.

* cited by examiner

ANIMAL TOILET

CROSS REFERENCE TO RELATED APPLICATION

This is a Continuation of International Application No. PCT/JP2022/029495 filed Aug. 1, 2022, which claims the benefit of Japanese Application No. 2021-153700 filed Sep. 22, 2021. The contents of these applications are hereby incorporated by reference in their entirety.

TECHNICAL FIELD

The present invention relates to an animal toilet.

BACKGROUND ART

A conventional animal toilet is disclosed, for example, in Patent Document 1. The animal toilet disclosed in Patent Document 1 includes a box-shaped body portion, and a hood that covers the body portion from above. Grains for treating excrement are laid in the body portion. In this animal toilet, an animal enters the internal space of the hood to excrete onto the grains.

CITATION LIST

Patent Document

Patent Document 1: JP 2019-103456 A

SUMMARY OF INVENTION

Technical Problem

In the animal toilet described above, there is an advantage that the grains are unlikely to spill outside the body portion since the upper part of the body portion is covered by the hood. However, on the other hand, there is a problem that a malodor of excrement is likely to accumulate in the internal space of the hood. The malodor accumulating in the internal space gives discomfort to the animal, and may be a factor that causes the animal to dislike excreting in the animal toilet.

Solution to Problem

The present invention has been made in view of the above-described problem, and it is an object thereof to provide an animal toilet in which a malodor is unlikely to accumulate in an internal space of a hood.

An animal toilet according to the present invention includes: a box-shaped body portion that has a bottom face part and a side face part; a hood that has an entrance for an animal, and covers the body portion from above; and a blower that is provided in an internal space of the hood.

In this animal toilet, the blower is provided in the internal space of the hood. The blower makes it possible to discharge air in the internal space of the hood outside the animal toilet through the entrance. For this reason, it is possible to make a malodor of excrement less likely to accumulate in the internal space.

Advantageous Effects of Invention

According to the present invention, it is possible to implement an animal toilet in which a malodor is unlikely to accumulate in an internal space of a hood.

DESCRIPTION OF EMBODIMENTS

Figure 1:
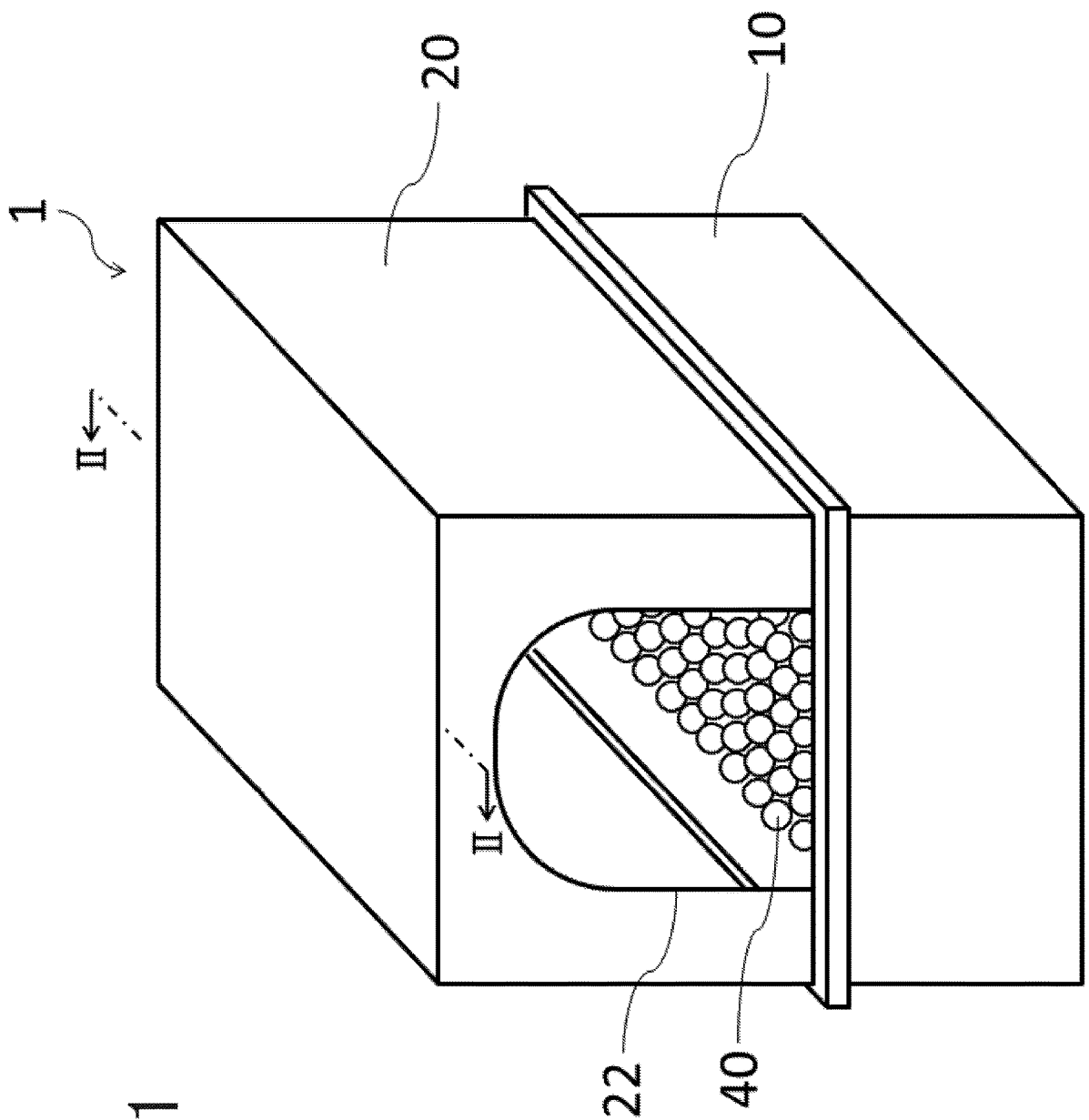
FIG. 1 is a perspective view showing a first embodiment of an animal toilet according to the present invention.

Hereinafter, embodiments of the present invention will be described in detail with reference to the drawings. In the description of the drawings, the same elements are given the same reference numerals, and a redundant description will be omitted.

First Embodiment

Figure 2:
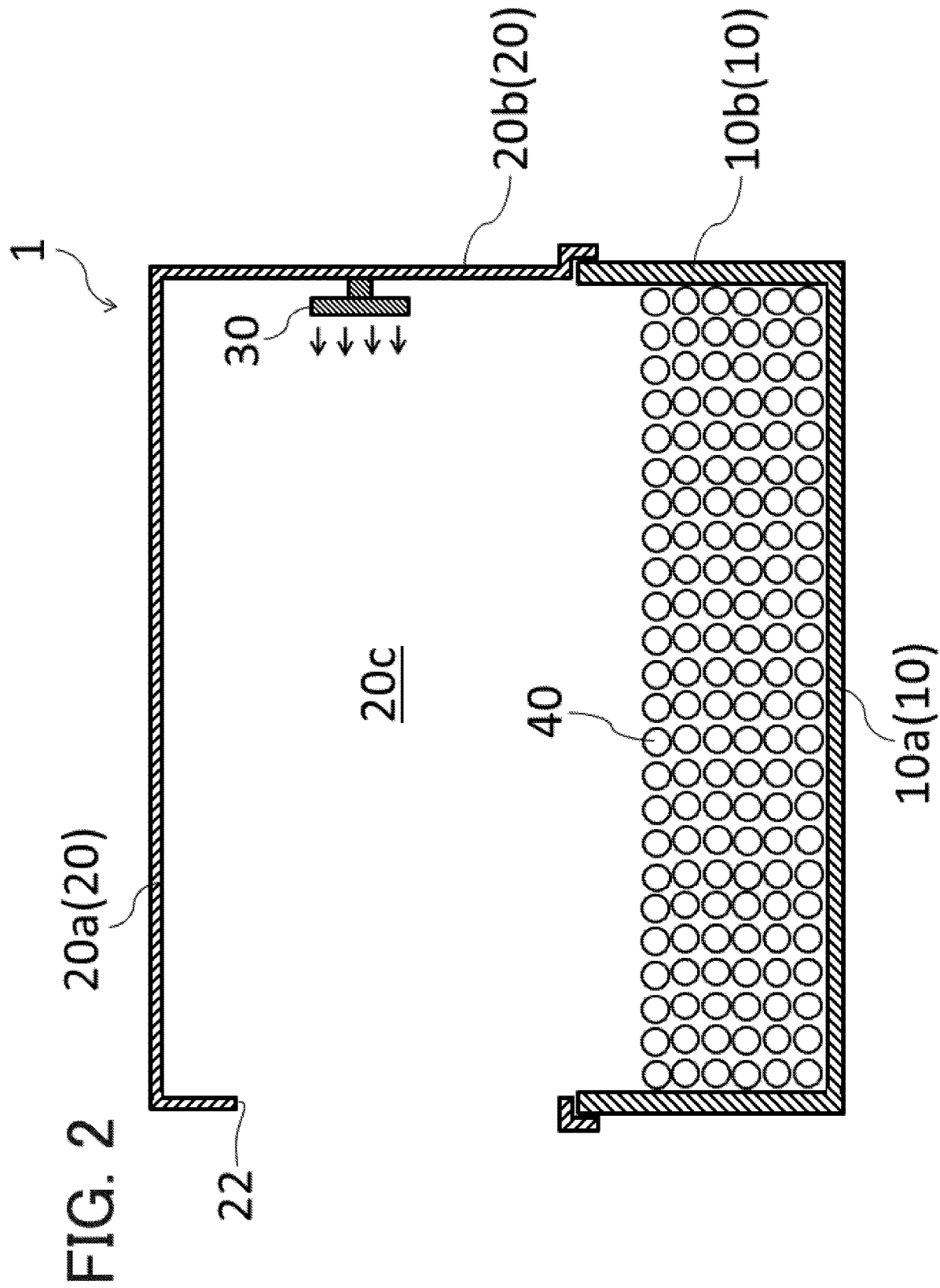
FIG. 2 is an end view taken along line II-II in FIG. 1.

FIG. 1 is a perspective view showing a first embodiment of an animal toilet according to the present invention. Also, FIG. 2 is an end view taken along line II-II in FIG. 1. An animal toilet 1 includes a body portion 10, a hood 20, a blower 30, and a plurality of grains 40. The body portion 10 has a bottom face part 10*a* and a side face part 10*b*, and is in a box shape. In the present embodiment, the body portion 10 is in an approximately rectangular parallelepiped shape. As a material of the body portion 10, for example, plastic such as polypropylene or polyethylene can be used.

The hood 20 is provided so as to cover the body portion 10 from above. The hood 20 has a ceiling part 20*a* and side face parts 20*b*. The ceiling part 20*a* is in a flat plate shape, and arranged in parallel with the bottom face part 10*a* of the body portion 10. The plane shape of the ceiling part 20*a* is an approximate rectangle. The side face parts 20*b* are provided at each of the front, rear, right side, and left side of the animal toilet 1. The upper end of each side face part 20*b* is connected to the ceiling part 20*a*. The vicinity of the lower end of each side face part 20*b* is formed in a hook shape so as to be fitted to the upper end of the side face part 10*b* of the body portion 10.

The hood 20 has an entrance 22 for animals. The entrance 22 is an entrance through which an animal (e.g. cat or dog) using the animal toilet 1 enters or leaves the animal toilet 1, and formed in the side face part 20b. In detail, the entrance 22 is formed in the side face part 20b provided at the front of the animal toilet 1. No opening is formed in the other three side face parts 20b, or the ceiling part 20a. As a material of the hood 20, for example, plastic such as polypropylene or polyethylene can be used.

Figure 3:
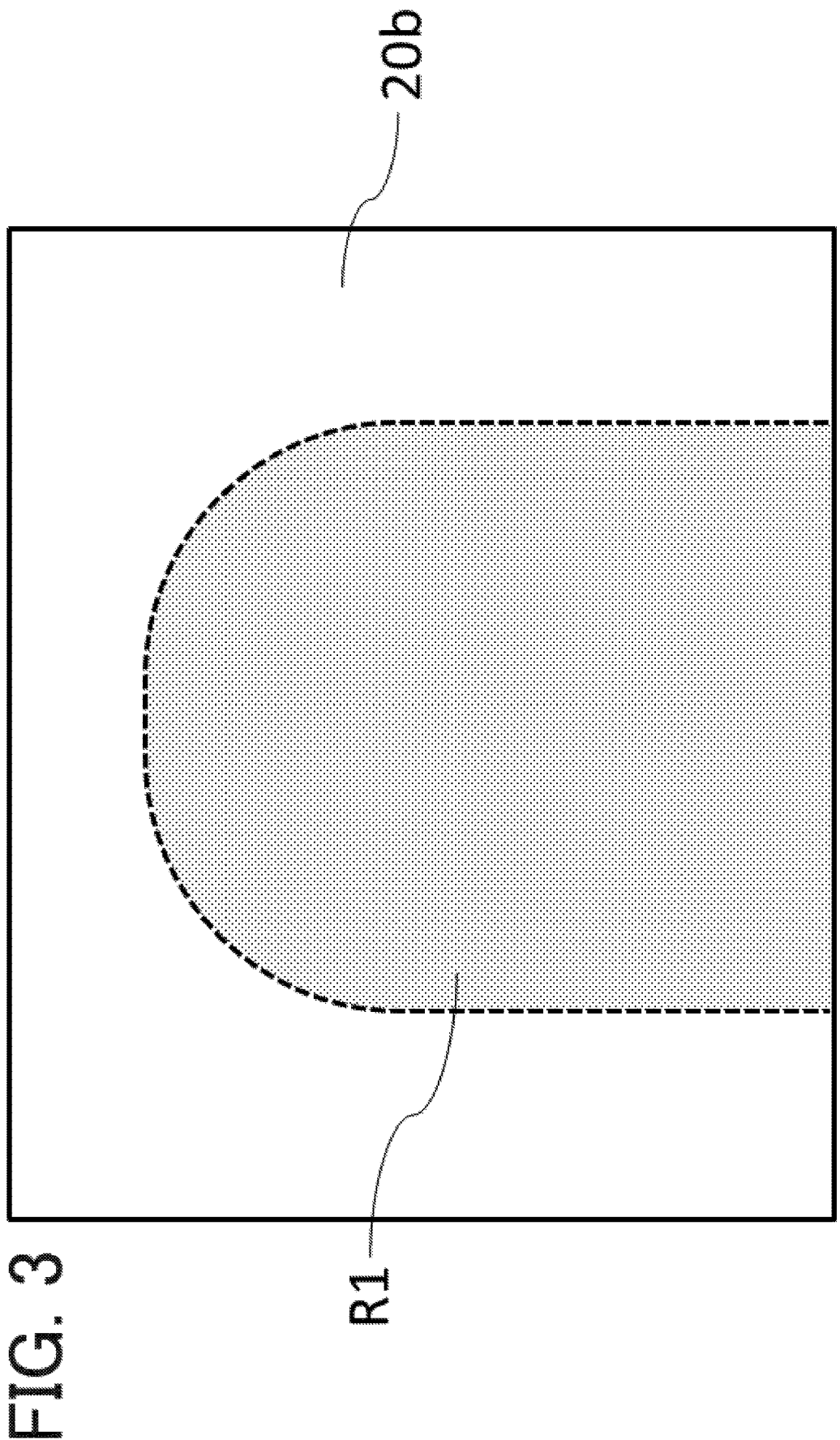
FIG. 3 is a diagram for illustrating a region R1 in a side face part 20*b* of a hood 20.

As can be seen from FIG. 2, the blower 30 is provided in the internal space 20c of the hood 20. The internal space 20c is the space that is surrounded by the ceiling part 20a and the side face parts 20b. The blower 30 is attached to the inner surface of the hood 20. In the present embodiment, the blower 30 is attached to the side face part 20b of the hood 20. Specifically, the blower 30 is attached to the region R1 (see FIG. 3) of the side face part 20b, the region R1 facing the entrance 22. As used herein, the region R1 is the region that is obtained by orthogonally projecting the entrance 22 on the side face part 20b provided at the rear of the animal toilet 1.

The blower 30 has a function of generating an air current in the internal space 20c to discharge at least part of air in the internal space 20c outside the animal toilet 1 through the entrance 22. The blower 30 includes an impeller, and a casing that houses the impeller. In the present embodiment, the blower 30 is an axial flow blower that generates air in parallel with the rotation shaft of the impeller. As shown by arrows in FIG. 2, the blower 30 is provided so as to send air horizontally toward the entrance 22. That is, the blowing direction of the blower 30 is horizontal.

On/off of the blower 30 can be manually switched by a switch (not shown). The switch is provided, for example, on the outer surface of the hood 20 (the ceiling part 20a or the side face part 20b). As a power source for operating the blower 30, an outlet or a battery may be used.

The animal toilet 1 may include a sensor that detects the animal entering or leaving the animal toilet 1. In that case, the blower 30 is preferably controlled such that on/off thereof is automatically switched in interlock with the sensor. As the sensor, for example, a human sensor or weight sensor can be used. The human sensor detects motion of the animal in the internal space 20c by infrared rays or the like. The human sensor is provided, for example, on the inner surface of the hood 20 (the ceiling part 20a or the side face part 20b). The weight sensor detects change of weight applied to the body portion 10. Specifically, the weight sensor detects whether the weight (except for the weight of the grains 40 described later) applied to the bottom face part 10a of the body portion 10 is equal to or more than a threshold or not. The threshold is set to a value that is more than the weight of excrement accumulating in the body portion 10 and less than the body weight of the animal using the animal toilet 1. The weight sensor is provided, for example, in the bottom face part 10a of the body portion 10.

For example, the blower 30 may be controlled such that the blower 30 is switched on when the sensor detects the animal entering the animal toilet 1. Alternatively, the blower 30 may be controlled such that the blower 30 is switched on when the sensor detects the animal leaving the animal toilet 1. Also, the blower 30 may be controlled such that the blower 30 is switched off when a certain time (e.g. 5 to 30 minutes) passes after the sensor detects the animal leaving the animal toilet 1. A control circuit of the blower 30 is preferably incorporated in the hood 20. For example, it can be considered to make the side face parts 20b have double structure composed of an outer plate (a plate constituting the outer surface of the side face parts 20b) and an inner plate (a plate constituting the inner surface of the side face parts 20b), and arrange the control circuit in the space between those plates.

The plurality of grains 40 for treating excrement (mainly urine) are disposed on the bottom face part 10a of the body portion 10. When the animal toilet 1 is used, the animal excretes onto the grains 40 in a state of getting directly on the grains 40 in the internal space 20c. Each grain 40 has a water absorbing property, and absorbs excrement.

The grains 40 having the water absorbing property require the liquid passing rate of less than 80% measured by the following test. First, approximate 50 grams of the grains 40 (sample) are placed in a sieve with the inner diameter of 10 cm and the mesh size of 1 mm. An empty beaker is set under the sieve. Then, 30 ml of water is dripped on the sample over 10 seconds using a syringe with the inner diameter of its outer cylinder of 3 cm and the inner diameter of its cylinder tip of 4 mm (60 ml syringe manufactured by Terumo Corp.). After waiting 1 minute, the quantity of the water in the beaker is measured. The ratio of the measured water quantity with respect to the quantity of the dripped water (30 ml) shall be the liquid passing rate. That is, if the water quantity in the beaker is less than 24 ml, the liquid passing rate is less than 80%, and therefore the grains 40 are found to have the water absorbing property.

Figure 4:
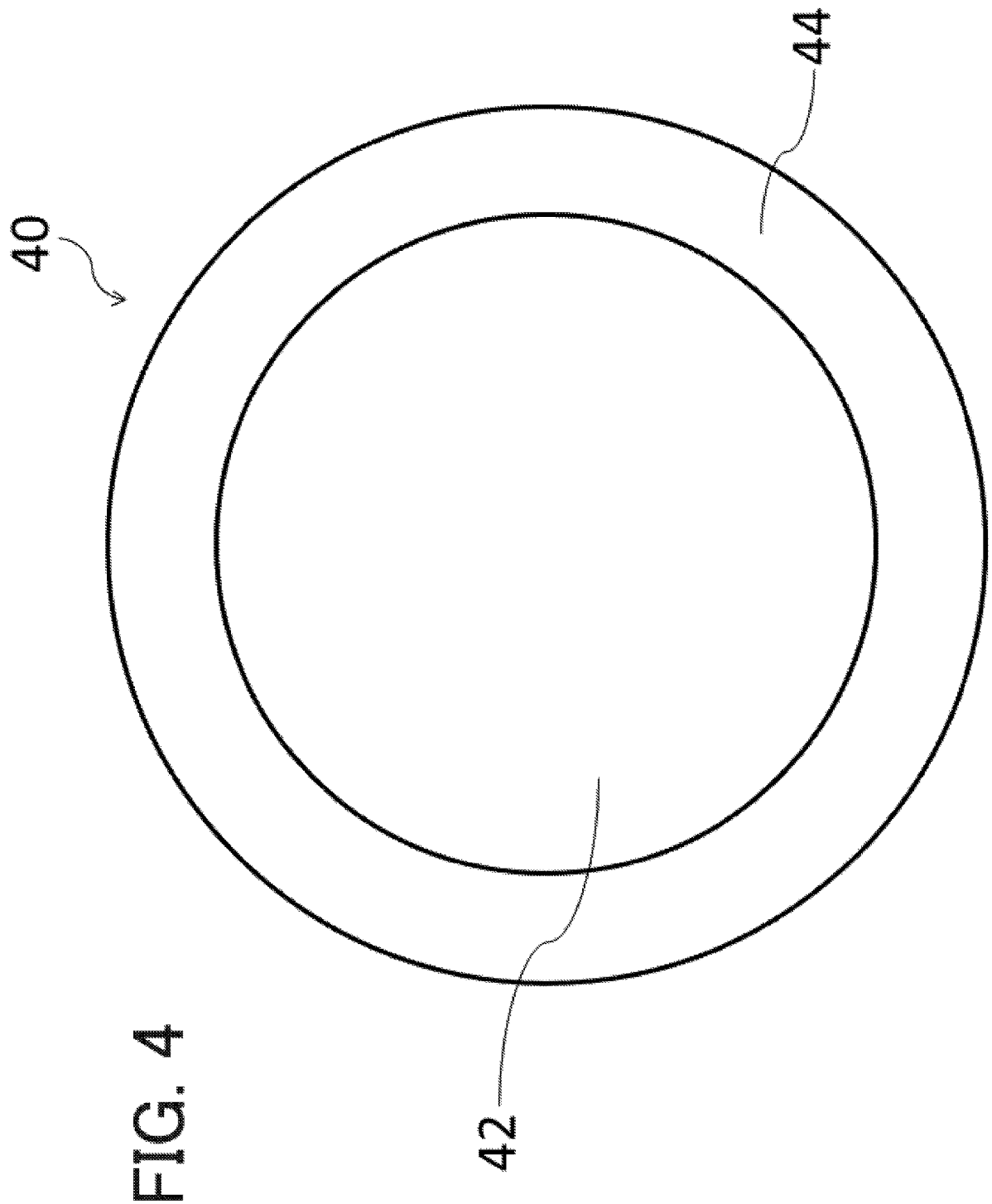
FIG. 4 is a schematic view showing a grain 40.

FIG. 4 is a schematic view showing the grain 40. The particle diameter of each grain 40 is, for example, between 5 mm and 20 mm inclusive. As used herein, the particle diameter of the grain 40 is defined as the diameter of the minimum sphere that can include the grain 40. Each grain 40 includes a core portion 42 and a coating portion 44. The core portion 42 is formed in a granular shape. Examples of the granular shape include a column, sphere, and ellipsoid. The core portion 42 has a function of absorbing and retaining excrement. It is preferable that the core portion 42 contains an organic substance as its main material. As used herein, the main material of the core portion 42 refers to the material that accounts for the highest weight ratio in the core portion 42, out of one or more materials constituting the core portion 42. As the organic substance, for example, papers, used tea leaves, plastics, or bean curd lees can be used.

The papers refer to a material made mainly of pulp. Examples of the papers include, in addition to ordinary paper, a vinyl chloride wallpaper classified product (paper obtained by classifying vinyl chloride wallpaper), fluff pulp, papermaking sludge, and pulp sludge. As the plastics, for example, a disposable diaper classified product (plastic obtained by classifying disposable diapers) may be used. The bean curd lees are preferably dried bean curd lees.

The coating portion 44 covers the core portion 42. The coating portion 44 may cover the entire surface of the core portion 42, or may cover only a part of the surface of the core portion 42. The coating portion 44 has a function of bonding the grains 40 that have absorbed excrement to agglomerate them. It is preferable that the coating portion 44 also contains an organic substance as its main material. The definition of the main material of the coating portion 44 is the same as the definition of the main material of the core portion 42. The coating portion 44 contains an adhesive material. As the adhesive material, for example, a water-absorbent polymer, starch, CMC (carboxymethyl cellulose), PVA (polyvinyl alcohol), or dextrin can be used. The water-absorbent polymer is, for example, sodium polyacrylate.

The grains 40 can be formed as follows, for example. First, the core portions 42 are formed by granulating a granulating material (material(s) constituting the core portion 42) with a granulation apparatus. As the granulation apparatus, for example, an extrusion granulator can be used. Prior to the granulation, pretreatment such as pulverization, kneading, and adding water is performed on the granulating material as needed. Next, the coating portion 44 is formed by attaching a powdery coating material (material(s) constituting the coating portion 44) to the surface of each core portion 42 with a coating apparatus or the like. The coating material can be attached by, for example, sprinkling or spraying. After that, posttreatment such as sieving (sizing), and drying is performed as needed. Thus, the plurality of grains 40 are formed.

The effects of the animal toilet 1 will be described. In the animal toilet 1, the blower 30 is provided in the internal space 20c of the hood 20. The blower 30 makes it possible to discharge air in the internal space 20c of the hood 20 outside the animal toilet 1 through the entrance 22. For this reason, it is possible to make a malodor of excrement less likely to accumulate in the internal space 20c. Accordingly, the animal toilet 1 is implemented in which a malodor is unlikely to accumulate in the internal space 20c.

Moreover, air from the blower 30 facilitates drying of the grains 40 wet with excrement. This contributes to easing generation of a malodor itself from the grains 40.

The blower 30 is attached to the hood 20. Thus, the animal toilet 1 having the air discharging function can be implemented without retrofitting a blower to the animal toilet 1.

The blower 30 is attached to the region facing the entrance 22 in the side face part 20b of the hood 20. Thus, an air current toward the entrance 22 can be easily generated in a wide range of the internal space 20c. By generating an air current widely in this way, it is possible to reduce a malodor accumulating in the internal space 20c.

The blower 30 is provided so as to send air horizontally. Thus, air in the internal space 20c can be efficiently discharged outside the animal toilet 1 through the entrance 22.

In the case where the blower 30 is controlled such that on/off is automatically switched in interlock with the sensor described above, it becomes possible to switch on/off of the blower 30 at an appropriate timing without manual operation by a human (owner).

In the case where the blower 30 is controlled such that the blower 30 is switched on when the sensor detects the animal entering the animal toilet 1, the animal can excrete more comfortably due to air being discharged during excretion.

In the case where the blower 30 is controlled such that the blower 30 is switched on when the sensor detects the animal leaving the animal toilet 1, a malodor just after excretion can be discharged from the internal space 20c. On the other hand, because air discharging is not performed during excretion, the animal can excrete without fear even in a case where the animal dislikes noise or air caused by operation of the blower 30.

In the case where the blower 30 is controlled such that the blower 30 is switched off when a certain time passes after the sensor detects the animal leaving the animal toilet 1, it is possible to prevent the blower 30 from operating for a long time more than necessary, which contributes to saving electricity.

In the case where the above-described sensor is a human sensor, it is possible to implement a sensor that detects the animal entering or leaving the animal toilet 1 at low cost.

In the case where the above-described sensor is a weight sensor, it is possible to implement a sensor that detects the animal entering or leaving the animal toilet 1 with high accuracy.

The plurality of grains 40 having a water absorbing property are disposed on the bottom face part 10a of the body portion 10. In this case, because the grains 40 absorb and confine excrement, it is possible to ease a malodor of excrement floating in the internal space 20c.

Each grain 40 includes the coating portion 44 containing an adhesive material in addition to the core portion 42. Thus, because an agglomeration of a plurality of the grains 40 that have absorbed excrement can be obtained, it becomes easier to remove only used grains 40 from the body portion 10. However, it is not essential that the grain 10 has multi-layer structure (double-layer structure) composed of the core portion 42 and the coating portion 44. The grain 40 may have single-layer structure composed only of the core portion 42.

In the case where the core portion 42 and the coating portion 44 both contain an organic substance as a main material, it is possible to obtain the grains 40 suitable for being disposed of by incineration. In this case, used grains 40 can be easily disposed of as burnable garbage, which therefore increases convenience for users.

Second Embodiment

Figure 5:
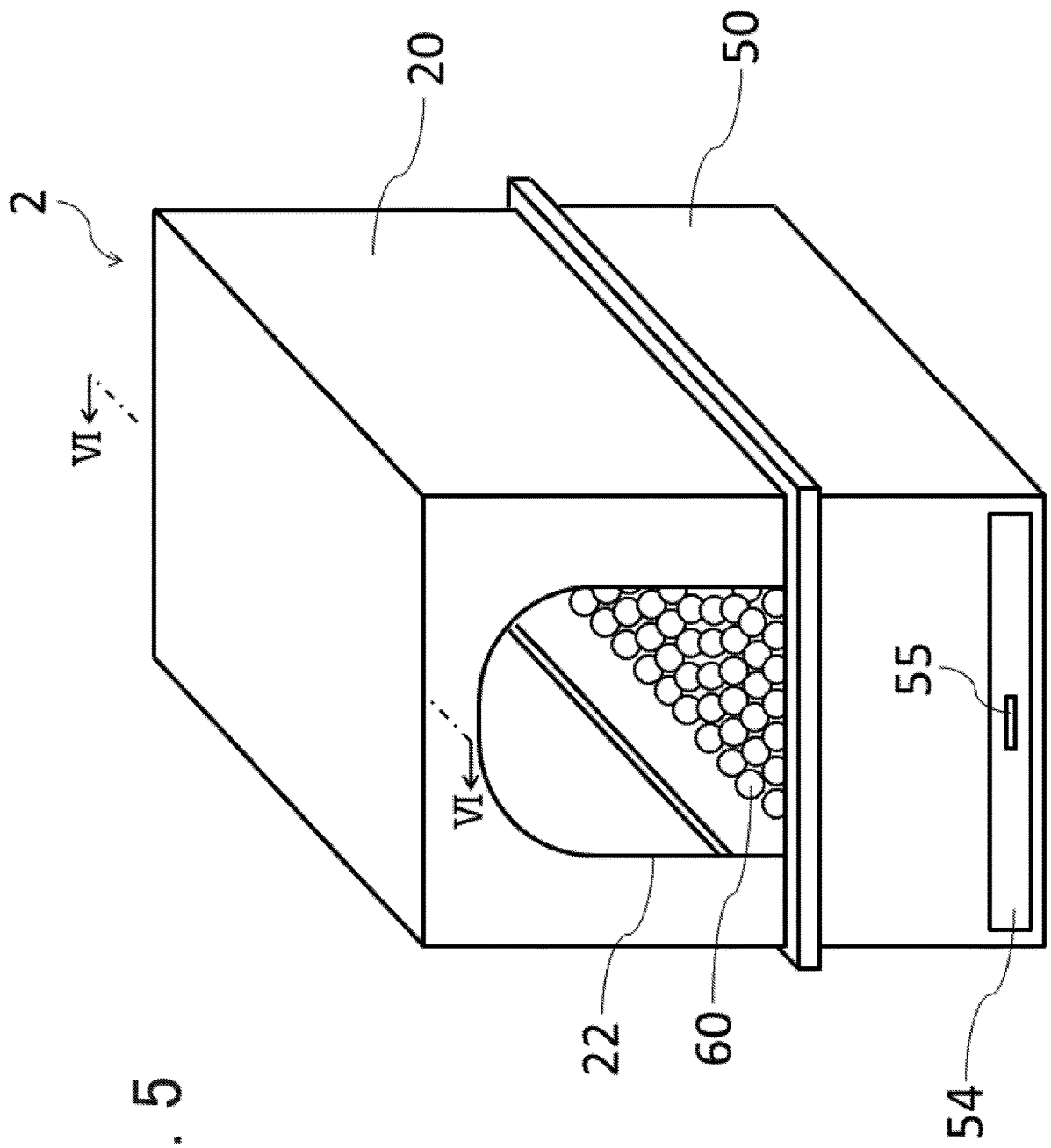
FIG. 5 is a perspective view showing a second embodiment of an animal toilet according to the present invention.
Figure 6:
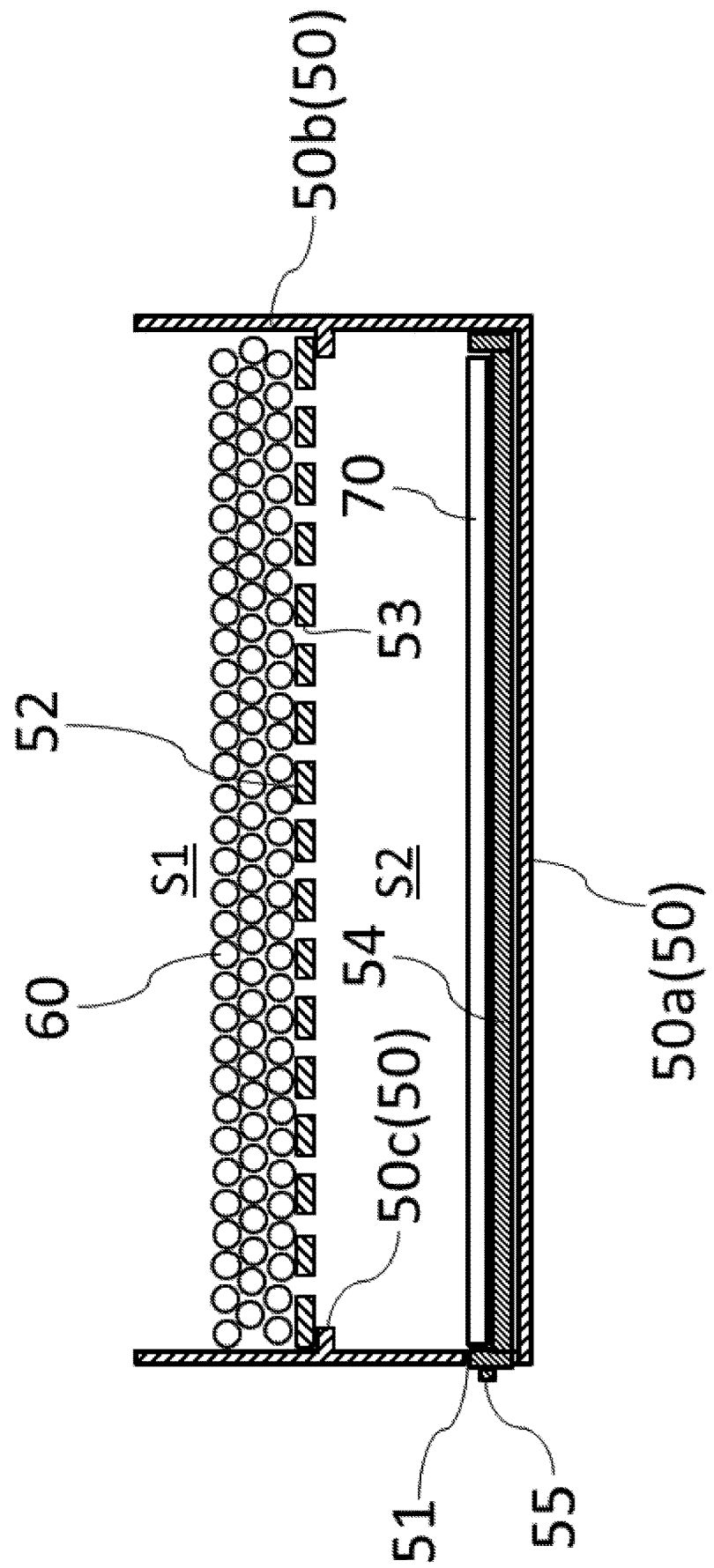
FIG. 6 is a partial end view taken along line VI-VI in FIG. 5.

FIG. 5 is a perspective view showing a second embodiment of an animal toilet according to the present invention. FIG. 6 is a partial end view taken along line VI-VI in FIG. 5. An animal toilet 2 includes a hood 20, a blower 30, a body portion 50, a partition portion 52, a drawer portion 54, a plurality of grains 60, and a water-absorbing sheet 70. The constitution of each of the hood 20 and the blower 30 is as described in the first embodiment. Note that the hood 20 and the blower 30 are not shown in FIG. 6. The body portion 50 has a bottom face part 50a and a side face part 50b, and is in a box shape. In the present embodiment, the body portion 50 is in an approximately rectangular parallelepiped shape. As a material of the body portion 50, for example, plastic such as polypropylene or polyethylene can be used.

The partition portion 52 is in a plate shape, and arranged in parallel with the bottom face part 50a. The partition portion 52 is composed of one plate, the entirety of which has the same thickness. The partition portion 52 is provided at a position apart from both the upper end of the body portion 50 (side face part 50b) and the water-absorbing sheet 70 described later. Thus, the partition portion 52 divides the inside of the body portion 50 vertically. That is, the internal space of the body portion 50 is divided into an upper space S1 and a lower space S2 by the partition portion 52. The partition portion 52 has a through hole 53 that allows urine of animals to pass through the through hole 53. The partition portion 52 is not fixed to the body portion 50, and is detachable relative to the body portion 50. As a material of the partition portion 52, for example, plastic such as polypropylene or polyethylene can be used.

The body portion 50 has a projecting part 50c that is provided so as to project from the side face part 50b toward the inside of the body portion 50. The projecting part 50c may be a projection or a projected rim. The projecting part 50c may be formed integrally with the side face part 50b, or may be attached to the side face part 50b after being formed separately from the side face part 50b. The projection length of the projecting part 50c (the length in the direction perpendicular to the inner surface of the side face part 50b provided with the projecting part 50c) is, for example, between 5 mm and 15 mm inclusive. The partition portion 52 is placed on the projecting part 50c.

The drawer portion 54 is capable of being inserted in and extracted from the body portion 50 through an opening 51 formed in the side face part 50b. The drawer portion 54 houses the water-absorbing sheet 70. As a material of the drawer portion 54, for example, plastic such as polypropylene or polyethylene can be used.

The plurality of grains 60 for treating excrement are disposed on the partition portion 52. When the animal toilet 2 is used, an animal excretes onto the grains 60 in a state of getting directly on the grains 60 in the internal space 20c of the hood 20. Each grain 60 has a hydrophobic property. That is, the grains 60 have the property of not absorbing excrement at all, or hardly absorbing it. The grains 60 having the hydrophobic property require the liquid passing rate of 80% or more measured by the test described above.

The grains 60 are each formed in a granular shape. The particle diameter of the grain 60 is, for example, between 5 mm and 20 mm inclusive. It is preferable that the grain 60 contains an organic substance as its main material. As the organic substance, for example, papers, used tea leaves, plastics, or bean curd lees can be used.

As the papers, in addition to those described above, for example, photographic paper, or release paper may be used. As the plastics, in addition to those described above, for example, an aluminum deposited film may be used. In a case where a material not having a hydrophobic property is used as a material of the grains 60, the material may be subjected to hydrophobic treatment (water repellency treatment) in advance.

The material(s) constituting the grain 60 may be only one material, or two or more materials. In the former case, the main material described above is the only material constituting the grain 60. In the latter case, the grain 60 is made of a mixture of the main material and other material(s). Examples of the other material include gypsum and baking soda. Adding gypsum or baking soda can enhance the hydrophobic property of the grain 60. The quantity of gypsum or baking soda is, for example, 5 wt. % or more and less than 50 wt. % with respect to the entirety of the grain 60.

The grains 60 can be manufactured by, for example, the following method. First, granules that will serve as the grains 60 are formed by granulating a granulating material (material(s) constituting the grain 60) with a granulation apparatus. As the granulation apparatus, for example, an extrusion granulator can be used. The granules may be subjected to hydrophobic treatment as needed. The hydrophobic treatment can be performed by, for example, coating the surfaces of the granules with a hydrophobic agent (water repellent agent). In the case where the hydrophobic treatment is not performed, it is preferable that crevices are prevented from forming in the granules as much as possible by increasing the pressure that is applied to the granulating material during granulation. This is because the crevices serve as a path through which moisture such as urine enters inside the grains 60. Prior to the granulation, pretreatment such as pulverization, kneading, and adding water is performed on the granulating material as needed. Also, after the granulation, posttreatment such as sieving (sizing), and drying is performed as needed.

The water-absorbing sheet 70 is disposed under the partition portion 52. In the present embodiment, the water-absorbing sheet 70 is disposed in the body portion 50 in a state of being housed in the drawer portion 54. The water-absorbing sheet 70 absorbs urine that has passed through the through hole 53 of the partition portion 52.

When the animal toilet 2 is used, urine excreted on the grains 60 flows downward, passing through gaps between the grains 60. The urine moves from the upper space S1 to the lower space S2 via the through hole 53 of the partition portion 52, and then is absorbed by the water-absorbing sheet 70.

Figure 7:
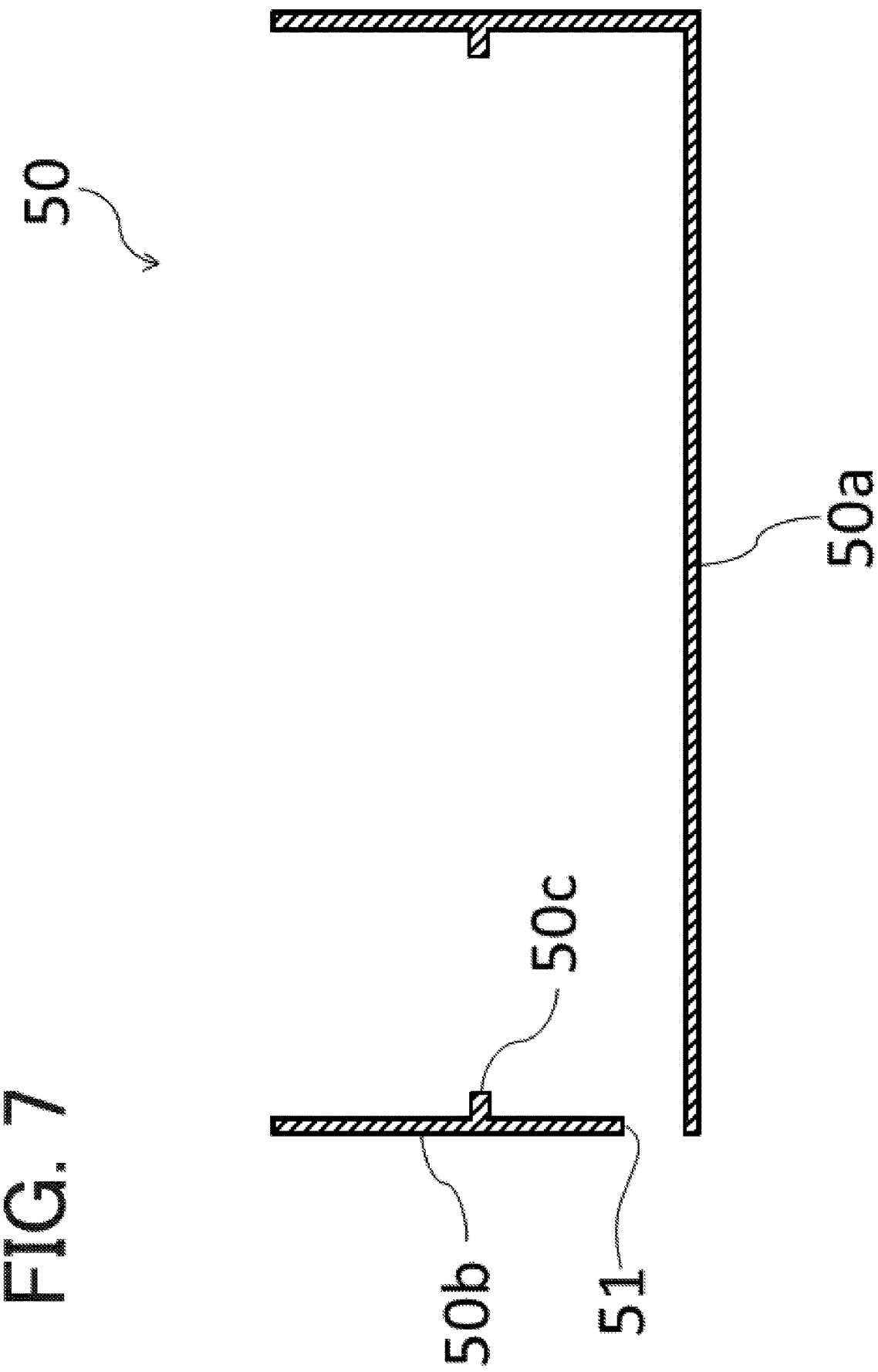
FIG. 7 is an end view showing a body portion 50.
Figure 8:
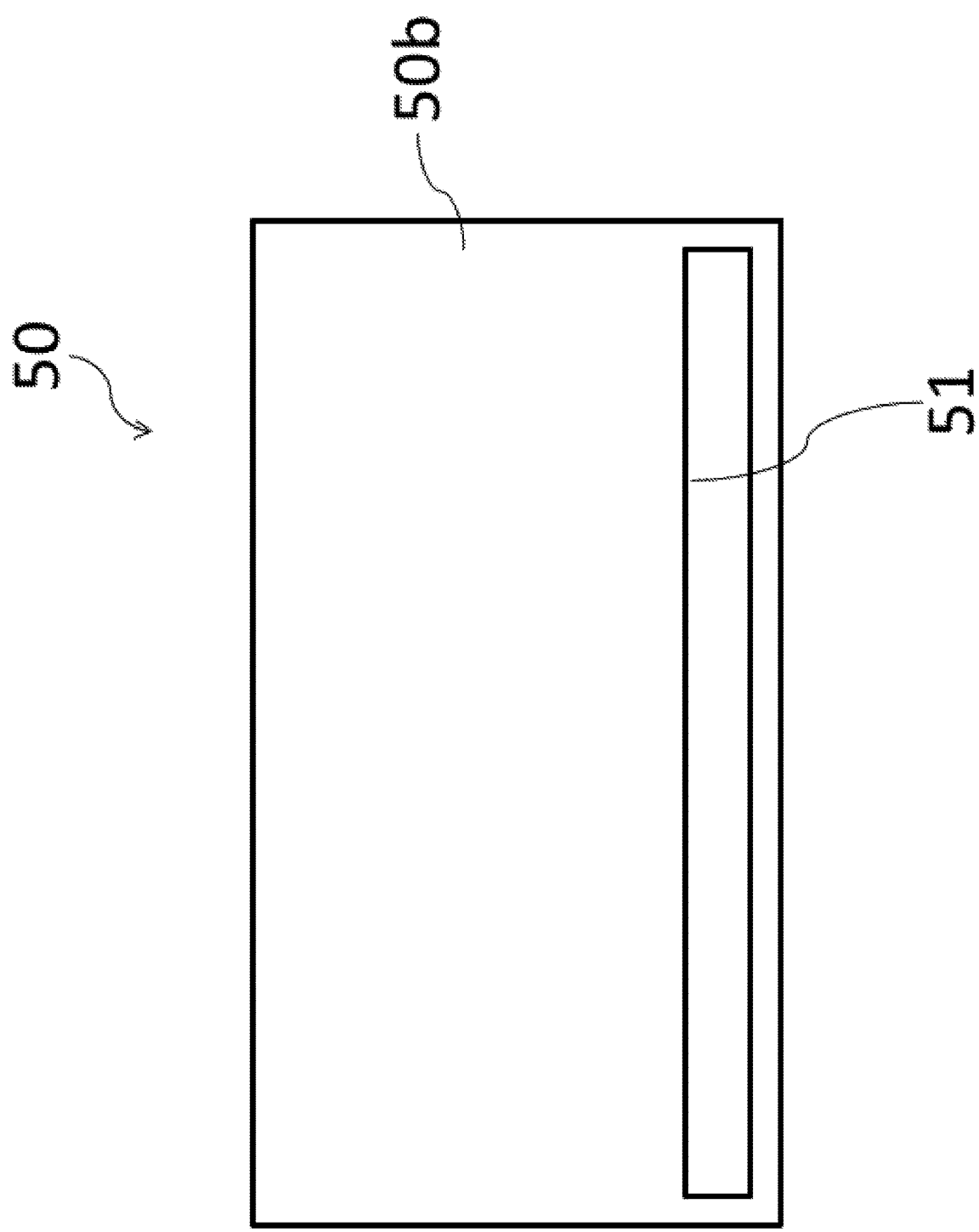
FIG. 8 is a front view showing the body portion 50.
Figure 9:
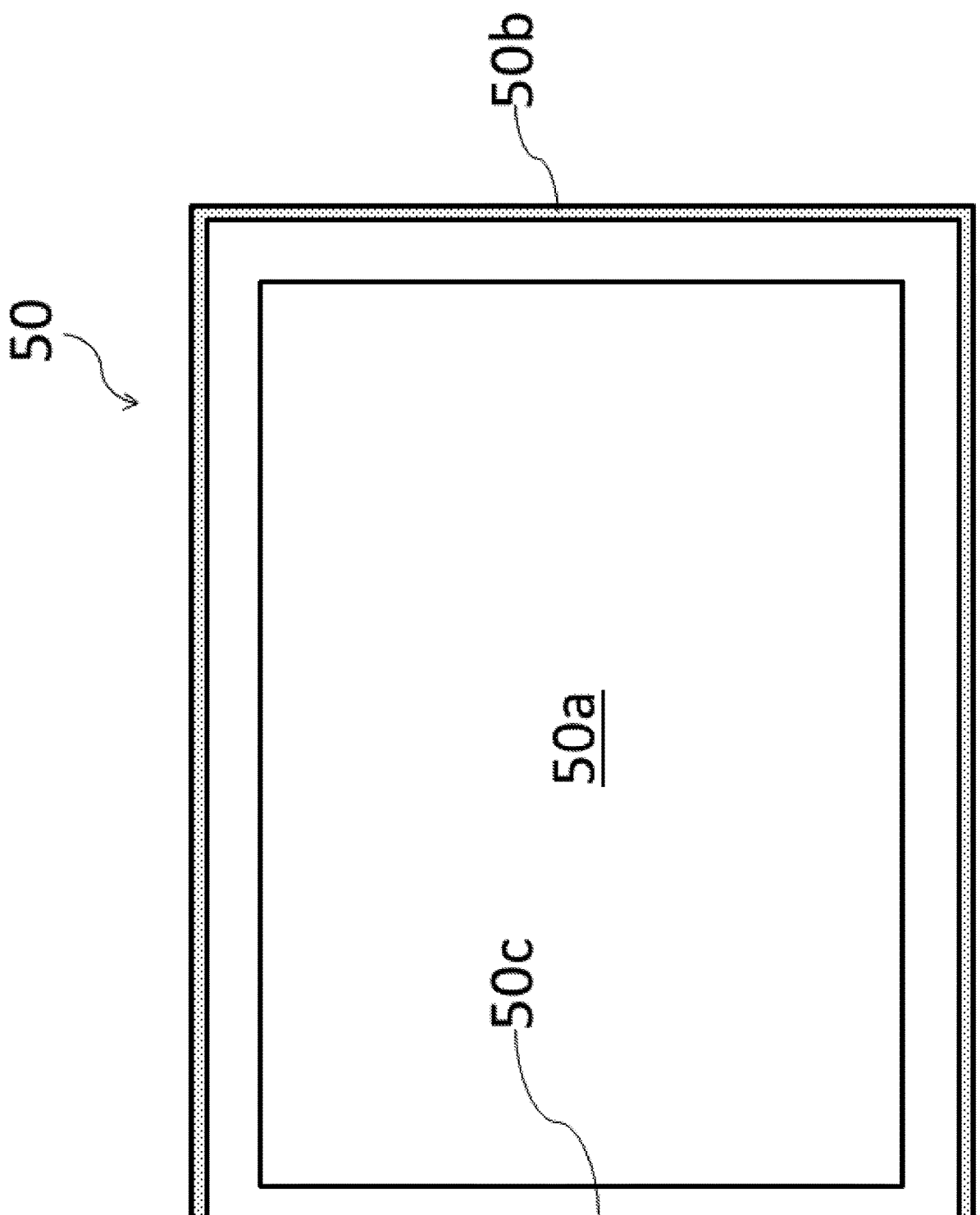
FIG. 9 is a plane view showing the body portion 50.

Hereinafter, referring to FIG. 7 to FIG. 11, the constitution of each portion of the animal toilet 2 will be described in detail. FIG. 7, FIG. 8 and FIG. 9 are, respectively, an end view, a front view and a plane view showing the body portion 50. As shown in FIG. 7 and FIG. 8, the opening 51 for inserting and extracting the drawer portion 54 is formed in the side face part 50b of the body portion 50. The opening 51 is located near the bottom face part 50a, and in a horizontally long rectangular shape. The length in the horizontal direction (right/left direction in FIG. 8) of the opening 51 is nearly equal to the breadth of the inside of the body portion 50, and is, for example, between 20 cm and 40 cm inclusive. The length in the vertical direction (top/bottom direction in FIG. 8) of the opening 51 is, for example, between 2 cm and 5 cm inclusive. Also, as shown in FIG. 9, the projecting part 50c is composed of a projected rim that is provided annularly over the entirety of the inner surface of the side face part 50b in a plane view in the present embodiment.

Figure 10:
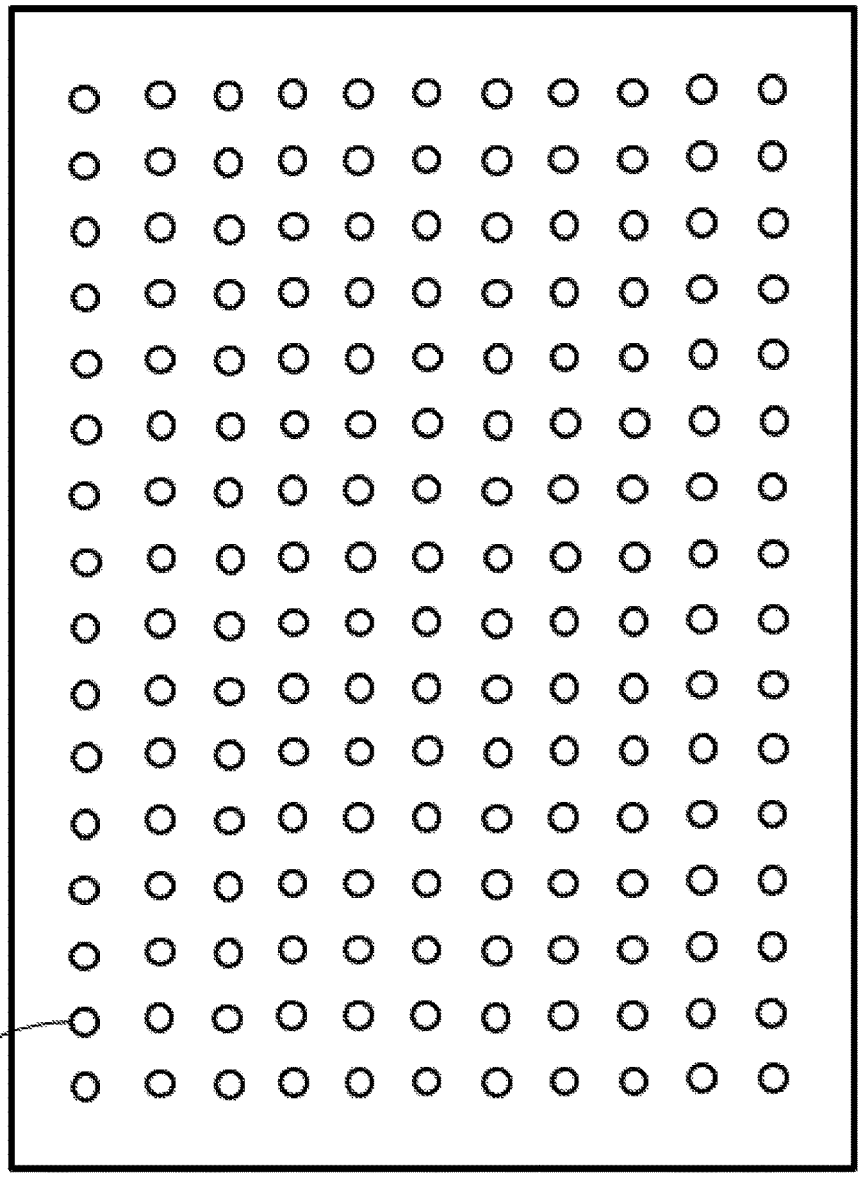
FIG. 10 is a plane view showing a partition portion 52.

FIG. 10 is a plane view showing the partition portion 52. A plurality of the through holes 53 are formed in the partition portion 52. The plurality of through holes 53 are arranged two-dimensionally in the partition portion 52. The through holes 53 each have such a size and shape that allow urine to pass therethrough, but do not allow the grain 60 to pass therethrough. The diameter of each through hole 53 is, for example, between 2 mm and 4 mm inclusive.

Figure 11:
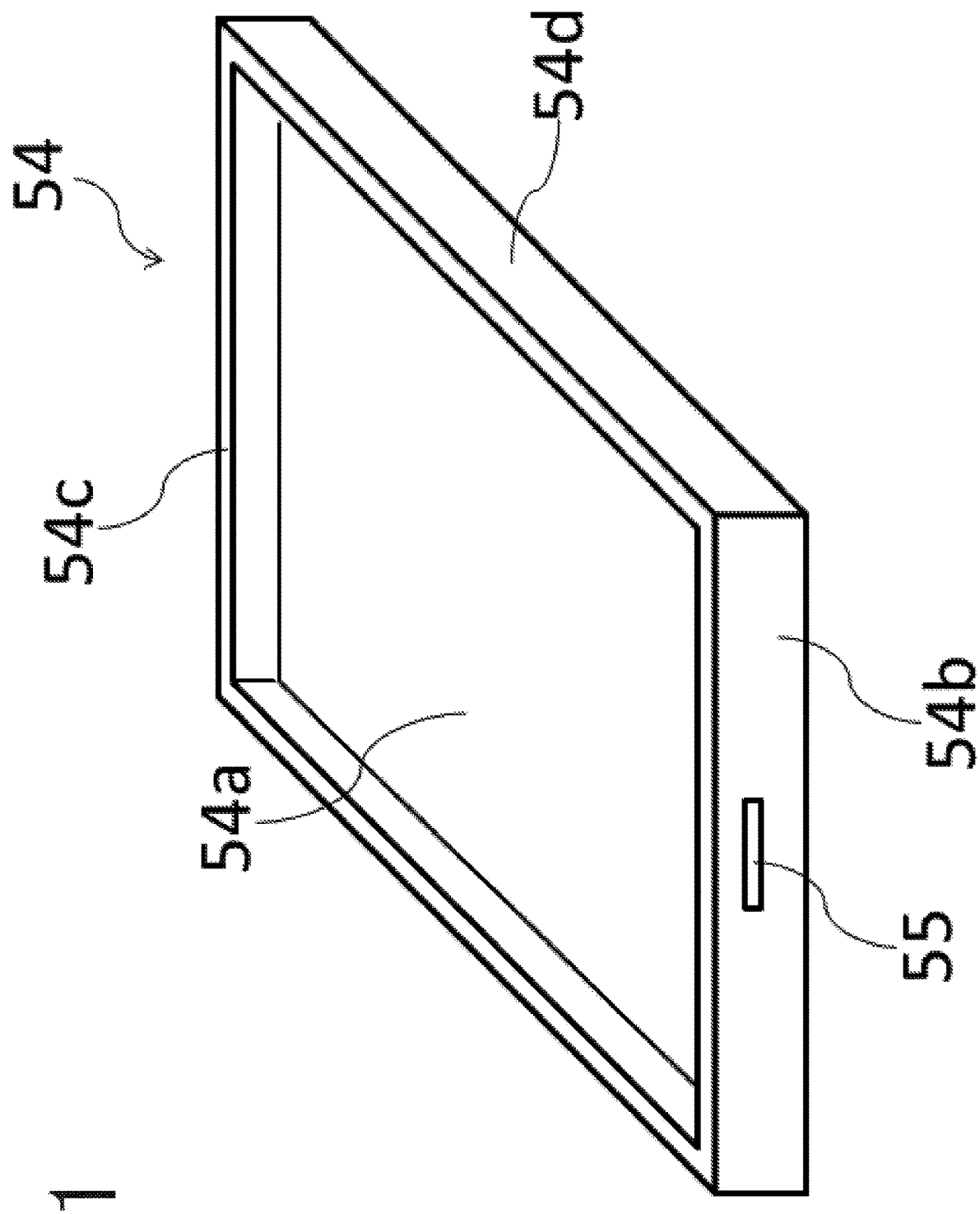
FIG. 11 is a perspective view showing a drawer portion 54.

FIG. 11 is a perspective view showing the drawer portion 54. The drawer portion 54 has a bottom board 54a, a front board 54b, a rear board 54c, and a pair of side boards 54d. The size of the bottom board 54a is nearly equal to the size of the bottom face part 50a of the body portion 50. The front board 54b has nearly the same shape and size as the opening 51. A grip 55 is attached to the front board 54b.

The effects of the animal toilet 2 will be described. In the animal toilet 2, the blower 30 is provided in the internal space 20c of the hood 20. The blower 30 makes it possible to discharge air in the internal space 20c of the hood 20 outside the animal toilet 2 through the entrance 22. For this reason, it is possible to make a malodor of excrement less likely to accumulate in the internal space 20c. Accordingly, the animal toilet 2 is implemented in which a malodor is unlikely to accumulate in the internal space 20c.

The partition portion 52 is provided that has the through holes 53 allowing urine of animals to pass therethrough and divides the inside of the body portion 50 vertically. Thus, because urine can accumulate in a space under the partition portion 52 (the lower space S2), it is possible to ease a malodor of urine floating in the internal space 20c.

The plurality of grains 60 having a hydrophobic property are disposed on the partition portion 52. In this case, most of urine excreted on the grains 60 is not absorbed by the grains 60, and passes through gaps between the grains 60. Thus, the urine can be smoothly guided to the partition portion 52.

The partition portion 52 is not fixed to the body portion 50. In this case, the partition portion 52 can be attached to and detached from the body portion 50 easily.

The partition portion 52 is placed on the projecting part 50c. Thus, the partition portion 52 can stay at a predetermined position in the body portion 50 without being fixed to the body portion 50.

The water-absorbing sheet 70 is disposed under the partition portion 52. Thus, urine accumulating in the lower space S2 can be confined in the water-absorbing sheet 70. For this reason, it is possible to further ease a malodor of urine floating in the internal space 20c.

The drawer portion 54 is provided that is capable of being inserted in and extracted from the body portion 50. Thus, it is possible to easily carry out the work of replacing a used water-absorbing sheet 70 with a new one. Other effects of the animal toilet 2 are the same as those of the animal toilet 1.

Figure 12:
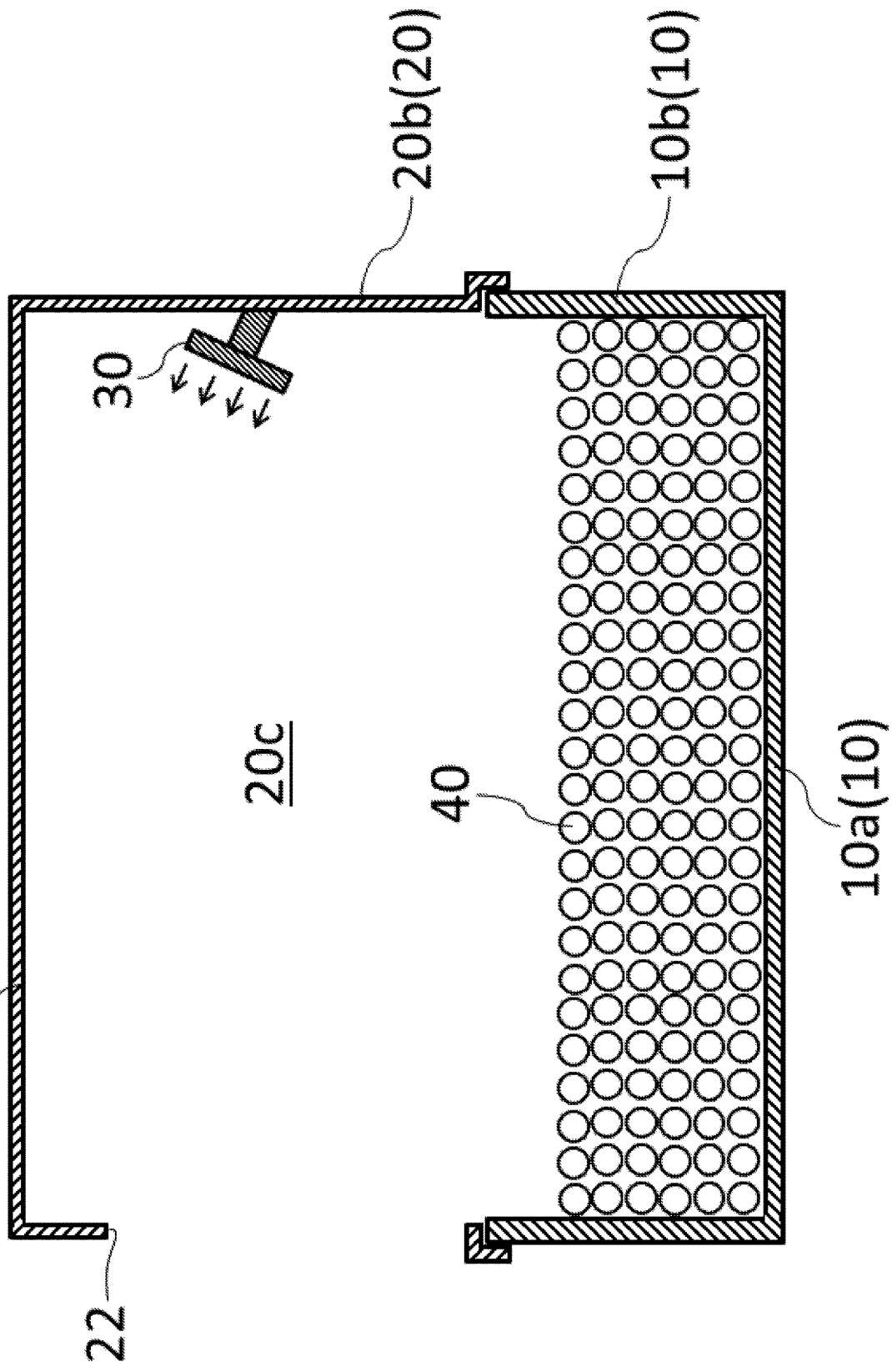
FIG. 12 is an end view for illustrating a modified example of a blower 30.
Figure 13:
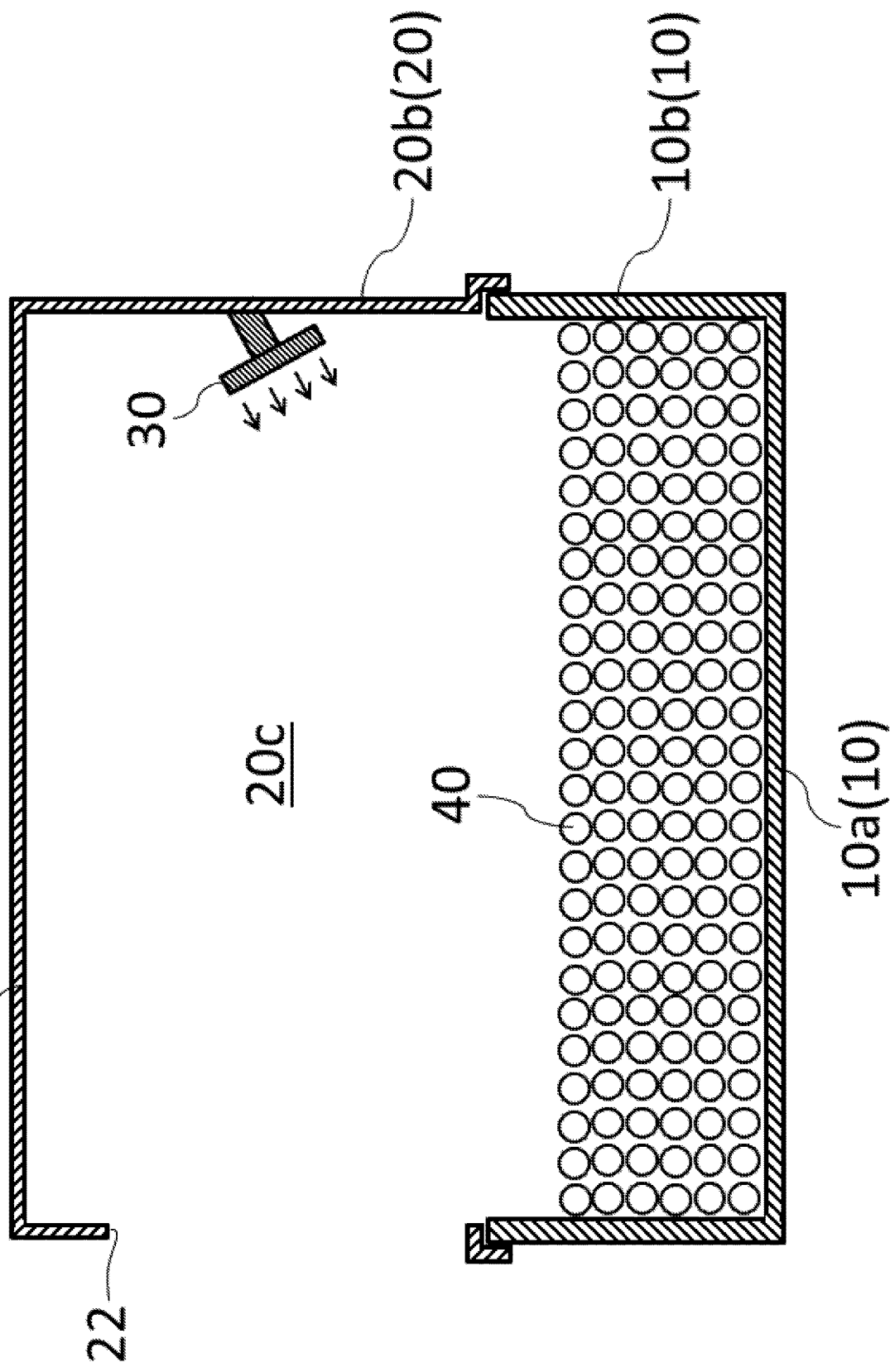
FIG. 13 is an end view for illustrating another modified example of the blower 30.

The present invention is not limited to the above-described embodiments, and various modifications can be made. In the above-described embodiments, an example is given in which the blower 30 is provided so as to send air horizontally. However, the blower 30 may be provided so as to send air obliquely upward as shown, for example, in FIG. 12. In that case, it is possible to make a malodor less likely to accumulate near the ceiling part 20a of the hood 20. Alternatively, the blower 30 may be provided so as to send air obliquely downward as shown, for example, in FIG. 13. In that case, because air from the blower 30 becomes more likely to reach the grains 40, it is possible to further facilitate drying of the grains 40 wet with excrement.

In the above-described embodiments, an example is given in which the blowing direction of the blower 30 is invariable. However, the blowing direction of the blower 30 may be variable. For example, the blower 30 with a variable blowing direction can be implemented by making the rotation shaft of the impeller movable. At this time, the movable range preferably includes all of the state in which the rotation shaft is horizontal (see FIG. 2), the state in which the rotation shaft is obliquely upward (see FIG. 12), and the state in which the rotation shaft is obliquely downward (see FIG. 13). In the case where those three states are included in the movable range, the blower 30 satisfies all of "the case of being provided so as to send air horizontally", "the case of being provided so as to send air obliquely upward", and "the case of being provided so as to send air obliquely downward". By making the blowing direction of the blower 30 variable in this way, an air current can be easily generated in a wide range of the internal space 20c.

Figure 14:
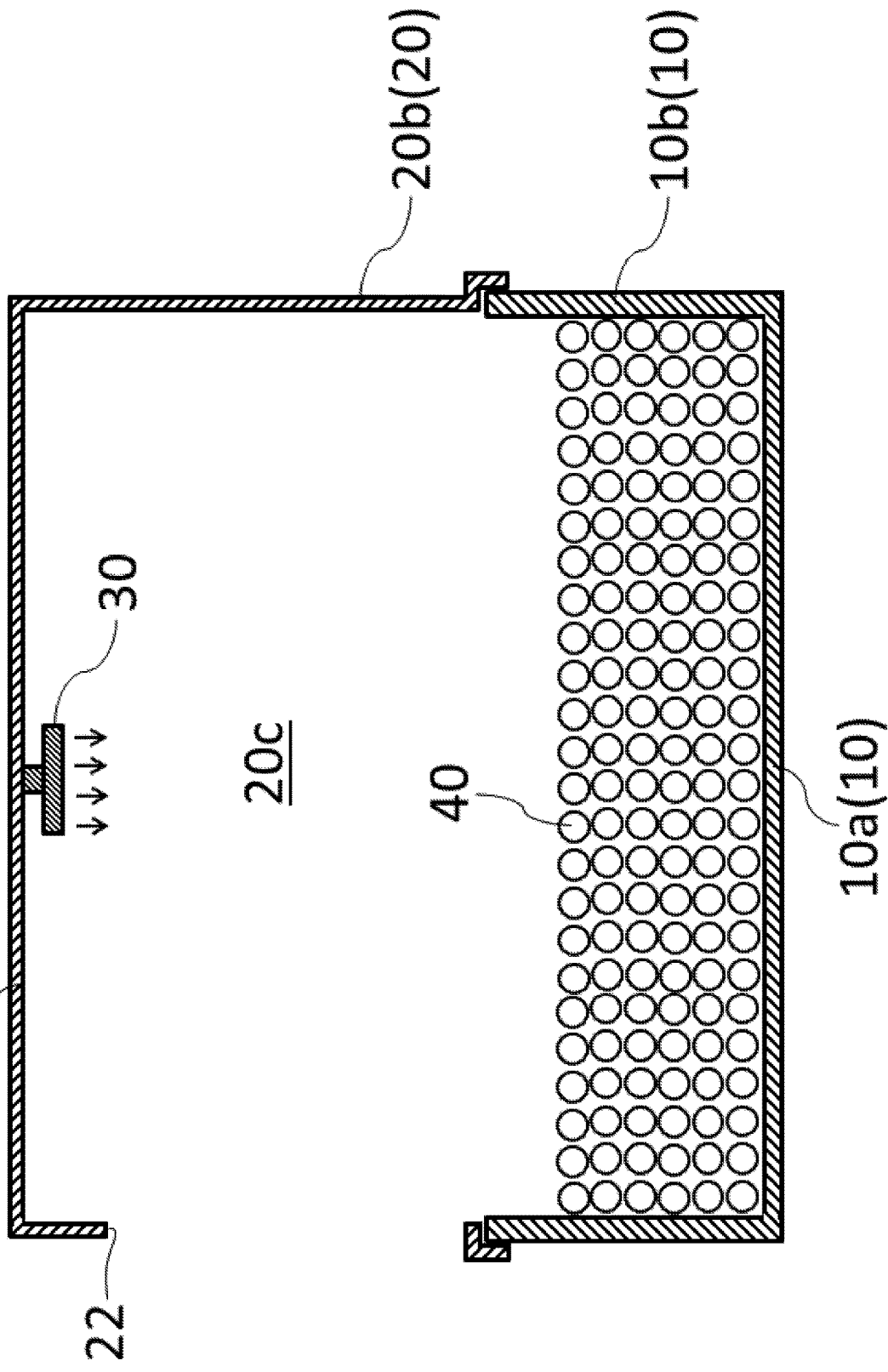
FIG. 14 is an end view for illustrating another modified example of the blower 30.
Figure 15:
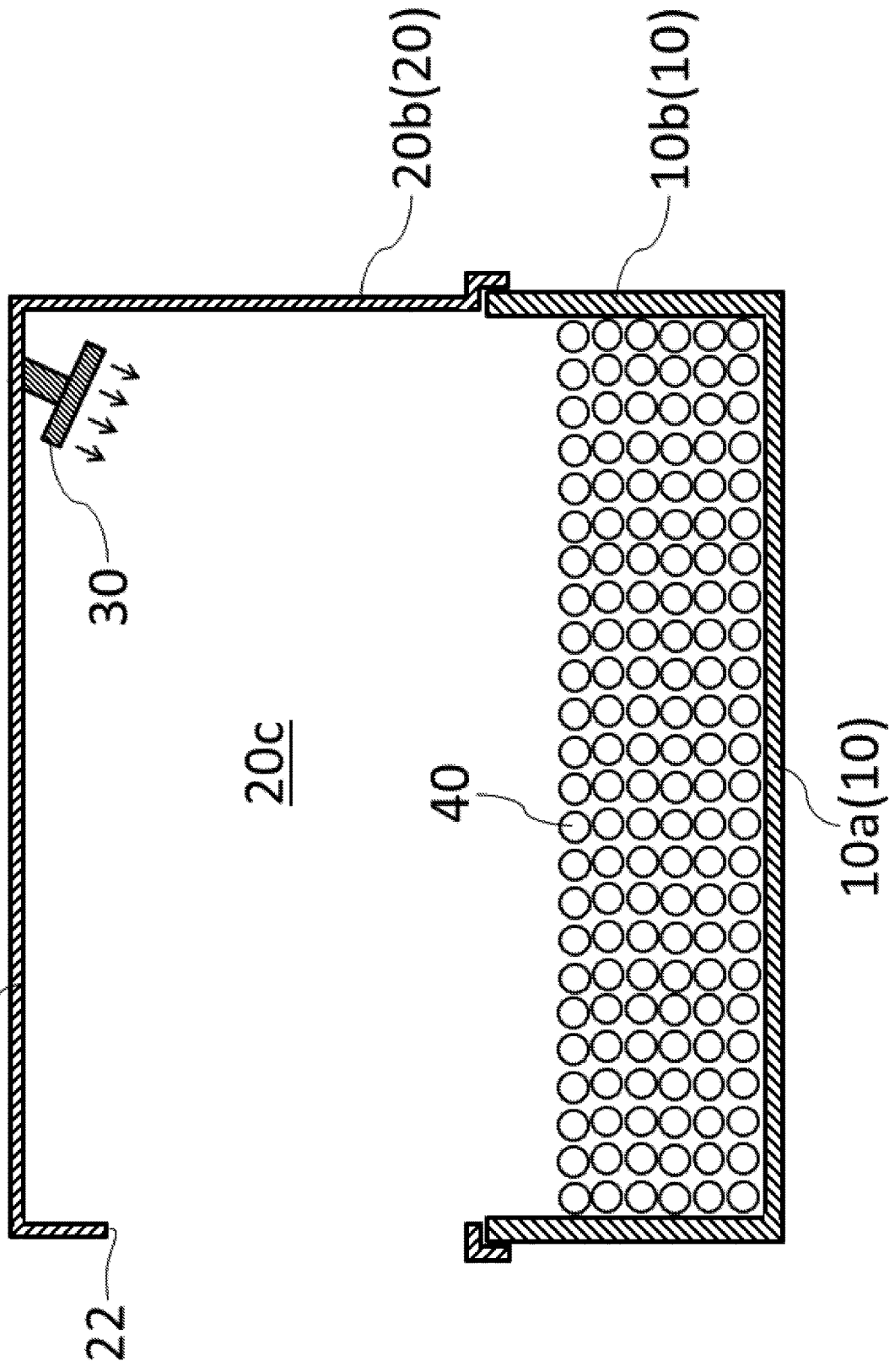
FIG. 15 is an end view for illustrating another modified example of the blower 30.
Figure 16:
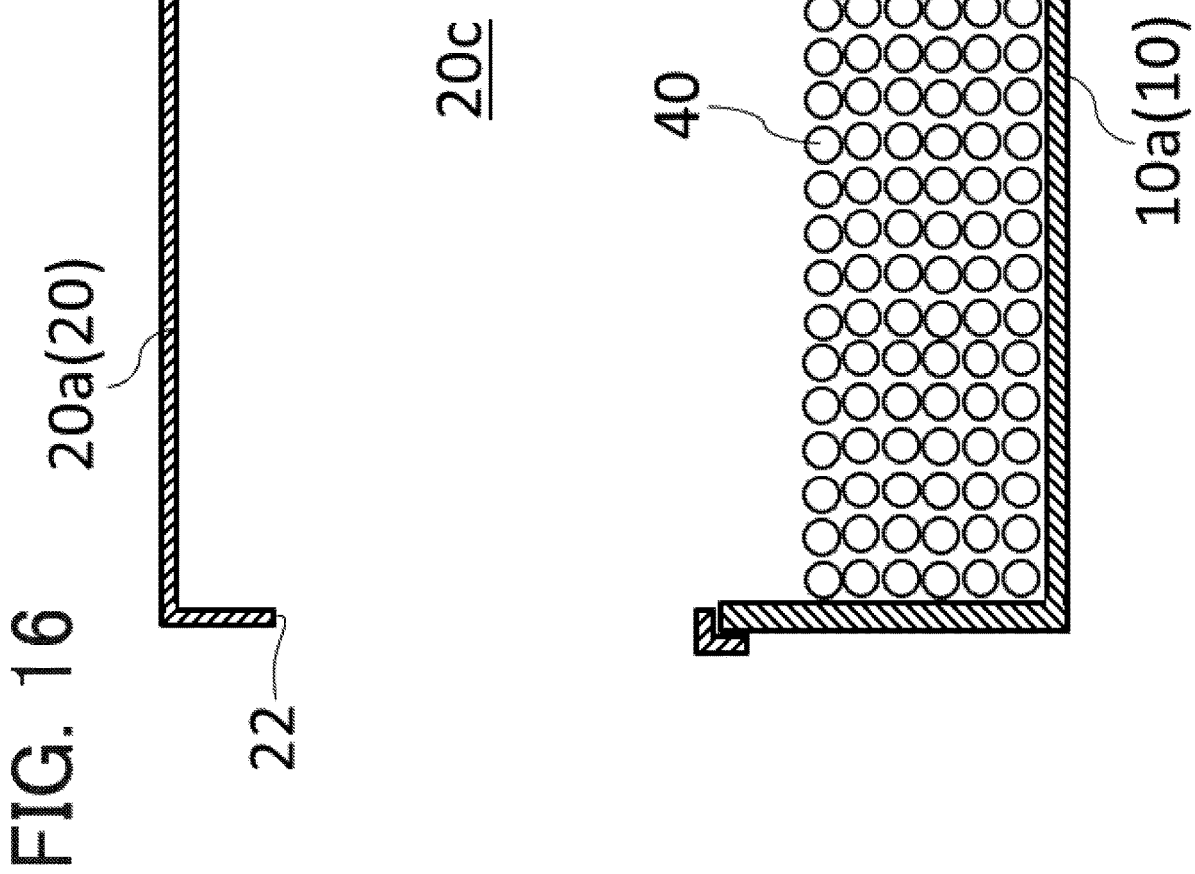
FIG. 16 is an end view for illustrating another modified example of the blower 30.

In the above-described embodiments, an example is given in which the blower 30 is attached to the region R1 (the region facing the entrance 22) of the side face part 20b of the hood 20. However, the blower 30 may be attached to a region other than the region R1 in the side face part 20b. Alternatively, the blower 30 may be attached to the ceiling part 20a as shown, for example, in FIG. 14 to FIG. 16. The blower 30 is provided so as to send air vertically downward in FIG. 14. The blower 30 is provided so as to send air obliquely downward in FIG. 15. The blower 30 is provided so as to send air horizontally in FIG. 16. Attaching the blower 30 to the ceiling part 20a in this way is advantageous for making an animal less likely to come in contact with the blower 30.

LIST OF REFERENCE NUMERALS

1 Animal Toilet
2 Animal Toilet
10 Body Portion
10a Bottom Face Part
10b Side Face Part
20 Hood
20a Ceiling Part
20b Side Face Part
20c Internal Space
22 Entrance
30 Blower
40 Grain
42 Core Portion
44 Coating Portion
50 Body Portion
50a Bottom Face Part
50b Side Face Part
50c Projecting Part
51 Opening
52 Partition Portion
53 Through Hole
54 Drawer Portion
55 Grip
60 Grain
70 Water-Absorbing Sheet
S1 Upper Space
S2 Lower Space

The invention claimed is:

1. An animal toilet comprising:
a box-shaped body portion that has a bottom face part and a side face part;
a hood that has an entrance for an animal, and covers the body portion from above; and
a blower that is provided in an internal space of the hood, wherein
the blower is attached to a region of the side face part of the hood, the region facing the entrance, and
the blower is configured to blow air toward the entrance.

2. The animal toilet according to claim 1,
wherein the blower is provided so as to send air horizontally.

3. The animal toilet according to claim 1,
wherein the blower is provided so as to send air obliquely upward.

4. The animal toilet according to claim 1,
wherein the blower is provided so as to send air obliquely downward.

5. The animal toilet according to claim 1,
wherein the blower is moveable within a moveable range including a horizontal state, an obliquely upward state, and an obliquely downward state such that a blowing direction of the blower is variable.

6. The animal toilet according to claim 1, further comprising:
a sensor that detects the animal entering or leaving the animal toilet,
wherein the blower is controlled such that on/off is automatically switched in interlock with the sensor.

7. The animal toilet according to claim 6,
wherein the blower is controlled such that the blower is switched on when the sensor detects the animal entering the animal toilet.

8. The animal toilet according to claim 6,
wherein the blower is controlled such that the blower is switched on when the sensor detects the animal leaving the animal toilet.

9. The animal toilet according to claim 7,
wherein the blower is controlled such that the blower is switched off when a certain time passes after the sensor detects the animal leaving the animal toilet.

10. The animal toilet according to claim 6,
wherein the sensor is an infrared sensor that detects motion of the animal in the internal space.

11. The animal toilet according to claim 6,
wherein the sensor is a weight sensor that detects change of weight applied to the body portion.

12. The animal toilet according to claim 1, further comprising:
a plurality of grains that are disposed on the bottom face part of the body portion, and have a water absorbing property.

13. The animal toilet according to claim 12,
wherein each of the grains includes
a core portion formed in a granular shape, and
a coating portion that contains an adhesive material and covers the core portion.

14. The animal toilet according to claim 13,
wherein the core portion and the coating portion both contain an organic substance as a main material.

15. The animal toilet according to claim 1, further comprising:
a partition portion that has a through hole allowing urine of the animal to pass therethrough, and divides an inside of the body portion vertically.

16. The animal toilet according to claim 15, further comprising:
a plurality of grains that are disposed on the partition portion, and have a hydrophobic property.

* * * * *